United States Patent [19]
Ballmer et al.

[11] Patent Number: 4,651,301
[45] Date of Patent: Mar. 17, 1987

[54] CIRCUIT ARRANGEMENT FOR PERFORMING RAPID SORTATION OR SELECTION ACCORDING TO RANK

[75] Inventors: Horst Ballmer, Heidenheim/Brenz; Henry Krämer, Leonberg, both of Fed. Rep. of Germany

[73] Assignee: Carl-Zeiss-Stiftung, Heidenheim, Fed. Rep. of Germany

[21] Appl. No.: 620,130

[22] Filed: Jun. 13, 1984

[30] Foreign Application Priority Data

Jun. 24, 1983 [DE] Fed. Rep. of Germany ....... 3322706

[51] Int. Cl.$^4$ .............................................. G06F 7/00
[52] U.S. Cl. .................................. 364/900; 340/146.2
[58] Field of Search ................................. 340/146.2; 364/900 MS File

[56] References Cited

U.S. PATENT DOCUMENTS 3,740,538  6/1973  Hemphill ..................... 340/146.2
4,410,960 10/1983  Kasuya ........................... 364/900
4,567,572  1/1986  Morris et al. ................... 364/900

Primary Examiner—David H. Malzahn
Attorney, Agent, or Firm—Walter Ottesen

[57] ABSTRACT

The invention is directed to a circuit arrangement for rapid sortation or selection of at least three digital values according to rank. In the circuit arrangement, the input channels are directly interconnected via digital comparators or arithmetic logic units. The outputs of the digital comparators or arithmetic logic units are connected to a gate-logic circuit or a ROM table controlling data selectors for the transfer of selected values or a network of data selectors for the sortation of all input values.

12 Claims, 3 Drawing Figures

Fig. 2

|  | n | m | l | u | v | w |  |
|---|---|---|---|---|---|---|---|
| a>b>c | 0 | 0 | 1 | 0 | 1 | 1 | ⎫ |
| a>c>b<br>a>c=b<br>a=c>b | 1 | 0 | 1 | 0 | 1 | 1 | ⎬ a |
| a=b=c | 1 | 1 | 1 | 0 | 1 | 1 | ⎭ |
| b>c>a | 0 | 1 | 0 | 1 | 0 | 1 | ⎫ b |
| b>a=c<br>b>a>c<br>b=a>c | 0 | 1 | 1 | 1 | 0 | 1 | ⎭ |
| c>a>b | 1 | 0 | 0 | 1 | 1 | 0 | ⎫ c |
| c>b>a<br>c>b=a<br>c=b>a | 1 | 1 | 0 | 1 | 1 | 0 | ⎭ |

CIRCUIT ARRANGEMENT FOR PERFORMING RAPID SORTATION OR SELECTION ACCORDING TO RANK

FIELD OF THE INVENTION

This invention relates to a circuit arrangement for rapidly sorting or selecting according to rank at least three digital values that are present in input channels as bit patterns.

BACKGROUND OF THE INVENTION

Many areas of digital electronics are directed to comparing several digital values and either selecting a specific value, for example, the lowest or the highest one, for further processing, or sorting the values in accordance with their relative rank, that is, according to the magnitude of their numerical value, for further processing.

For the comparison of two values, digital comparators have been known for some length of time as shown, for example, in the text entitled "Halbleiterschaltungstechnik", by U. Tietze, Ch. Schenk, 5th edition, Berlin, 1980. These devices compare the digital values P and Q present at their inputs and produce, dependent on the result of the comparison, a signal at one of the outputs $P = Q$, $P < Q$, $P > Q$ for further processing.

Further, for comparison of two digital values, the use of arithmetic logic units (ALU) is known which utilize in this case only the subtraction instruction. In these ALU's, the carry or sign output, for example, can be utilized to indicate which of the two values temporarily present is the larger one.

For a comparison of more than two values it is known to arrange a suitable number of digital comparators or ALU's in a circuit such that initially two values are compared, followed by a comparison of the larger one of these two with the third value if the largest of all values is sought, and so on until all values have been covered. If it is desired to determine the median, that is, the mean value of a group of values, the possibility must exist to exchange the values upon each comparison. Each time a new value enters the process, it has to be compared with the values already sorted and exchanged, where applicable, until its appropriate position is established. Since the steps described for this sorting operation are executed sequentially, numerous memories or buffer registers and switches are necessary to handle all the further new groups of values continuously supplied (clocked) via the input channels as is the case, for example, in video-rapid image analysis utilizing synchronous clock pulses. In such an analysis, all incoming units of image information such as the gray values of the image elements of an evaluation window, have to be processed at the same frequency as they arrive. Therefore, in a large evaluation window involving the comparison of many values, the processing in many successive steps results in a highly complex structure comprised of many memories or buffer registers and switches for performing the selection or sorting operations.

SUMMARY OF THE INVENTION

It is therefore an object of the invention to provide a circuit arrangement which performs sortation or selection according to rank as rapidly as possible with reduced structural complexity in applications requiring the comparison of many values.

This object is achieved with the circuit arrangement of the invention by directly interconnecting all input channels via digital comparators or arithmetic logic units (ALU) and by coupling the outputs of the digital comparators or ALU's to an evaluation circuit.

Known circuit arrangements permit only two values of an evaluation group to be compared at a time, and it is only after one of these values is selected or sorted that it can be compared with another value, and so on until eventually all values of an evaluation group are compared with each other and sorted, as the case may be. By contrast, the circuit arrangement of the invention provides for a comparison of any value of an evaluation group with every other value simultaneously, with a selection or sortation covering all values being performed only once. Accordingly, the inputs of all digital comparators or ALU's are directly connected to the input channels without requiring additional buffer memories, registers or similar components.

In an advantageous embodiment of the invention, the carry or sign outputs of the ALU's are connected to the evaluation circuit.

The evaluation circuit may be configured as a gate-logic circuit; if the circuit arrangement is configured to accommodate more than three input values, a ROM table is particularly advantageous.

The evaluation circuit may be used to control a data selector coupling one of the input channels to another circuit section. It is also possible to couple several selected input channels to another circuit section using several data selectors. In another embodiment of the invention, the evaluation circuit controls a network of data selectors coupling all input channels to a further circuit section in the established order of rank.

The circuit arrangement of the invention does not require more digital comparators or ALU's than known circuit arrangements. By contrast with the latter, most of the buffer memories and some of the switches are dispensed with, thus speeding up processing time and reducing circuit complexity which is a significant advantage in particular cases where a larger number of input channels, for example seven or ten, is involved.

BRIEF DESCRIPTION OF THE DRAWING

The invention will now be described with reference to the drawing wherein:

FIG. 2 is the truth table for the gate-logic circuit of FIG. 1; and,

DESCRIPTION OF THE PREFERRED EMBODIMENTS OF THE INVENTION

Figure 1:
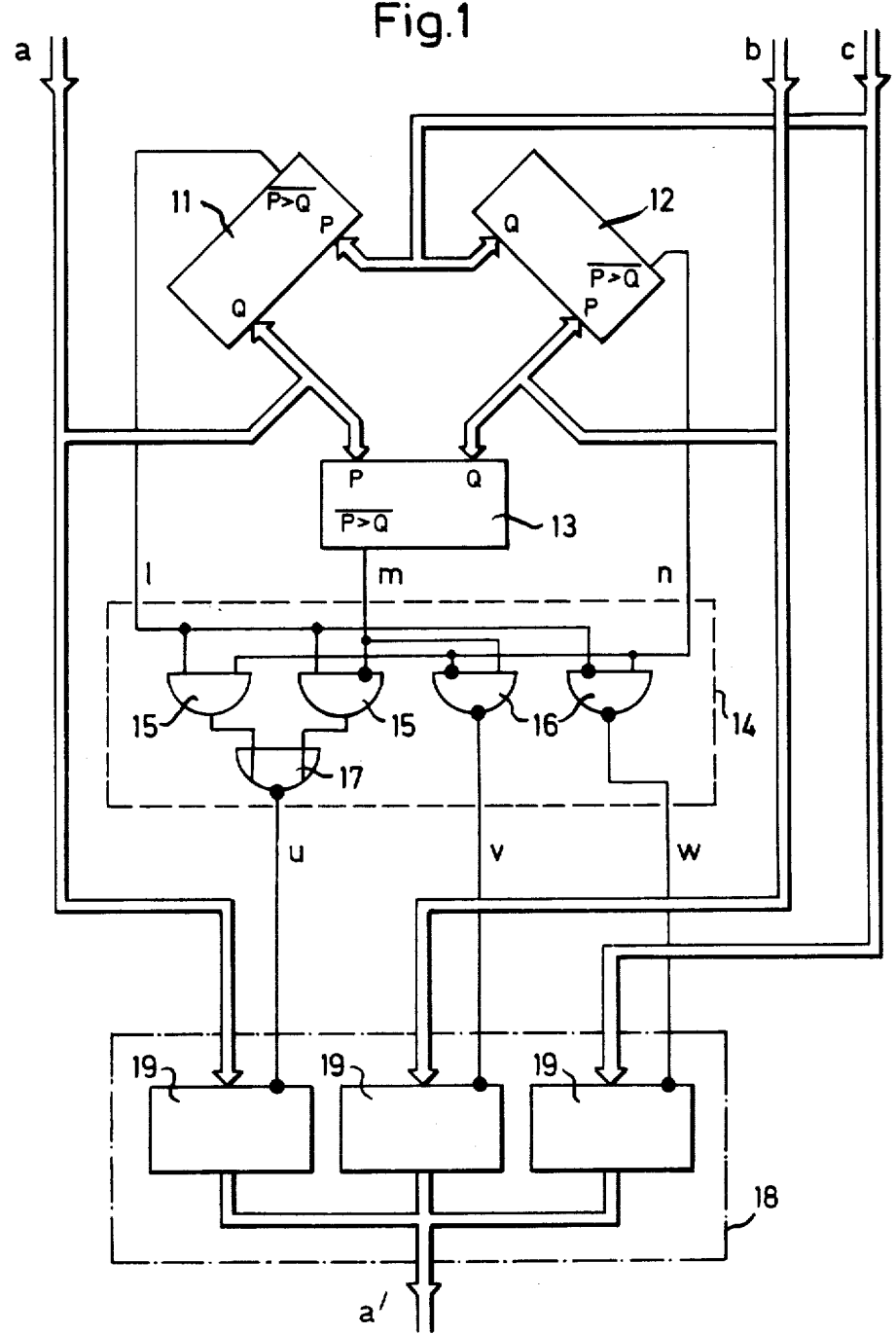
FIG. 1 is a circuit arrangement for the selection of three input values according to rank, using digital comparators and a gate-logic circuit for the selection of, for example, the largest input value.

Referring now to FIG. 1, reference letters a, b and c identify three input channels each of which is made up of say, eight lines so that each channel will transmit eight bits in parallel. Via inputs P and Q of the three digital comparators 11, 12 and 13, the three input channels a, b and c are interconnected with one another "cyclically" so that the values of all three input channels are compared with one another simultaneously.

In the embodiment shown, the inverted outputs P > Q of the three digital comparators used are connected to gate-logic circuit 14 through lines 1, m and n. It is, of course, also possible to use the outputs P < Q or to use different outputs with different comparators. The units of information arriving from the digital comparators 11, 12 and 13 are suitably processed in gate-logic circuit 14 to control the data selector 18 via lines u, v and w. In this arrangement, the gate-logic circuit configuration depends on which digital comparators 11, 12, 13 and data selector 18 are used. The latter is made up of commercially available modules, in the embodiment of FIG. 1, for example, of three bus drivers 19 having tristate outputs eight bits wide (Texas Instruments 74 LS 244) one of which is connected through while the others are opened, whereby one of the three input channels a, b or c becomes output channel a' to be coupled to another circuit section.

If, in addition, Texas Instruments 74 LS 682 type digital comparators are used and if it is desired to couple, for each comparator, the input channel at which the largest value is present to a further circuit section, gate-logic circuit 14 may be configured according to FIG. 1 which includes AND gates 15, NAND gates 16 and NOR gate 17. FIG. 2 shows the truth table for this configuration. The first column of this table contains all possible combinations for the values of the three input channels a, b and c. The next three columns indicate the levels of lines 1, m and n, with 0 meaning a low and 1 a high level. (The combination 0 0 0 does not occur.) The next three columns indicate the levels of the control lines u, v, w as generated by the gate-logic circuit for transfer to the bus drivers 19. Finally, the last column indicates which of the three input channels is coupled to the subsequent circuit section (not shown in FIG. 1).

It is to be understood that in this example the ROM table described with reference to FIG. 3 may be used in place of gate-logic circuit 14. Likewise, the ALU's and the data selector network described with reference to FIG. 3 may be substituted for the digital comparators and the data selector.

Figure 3:
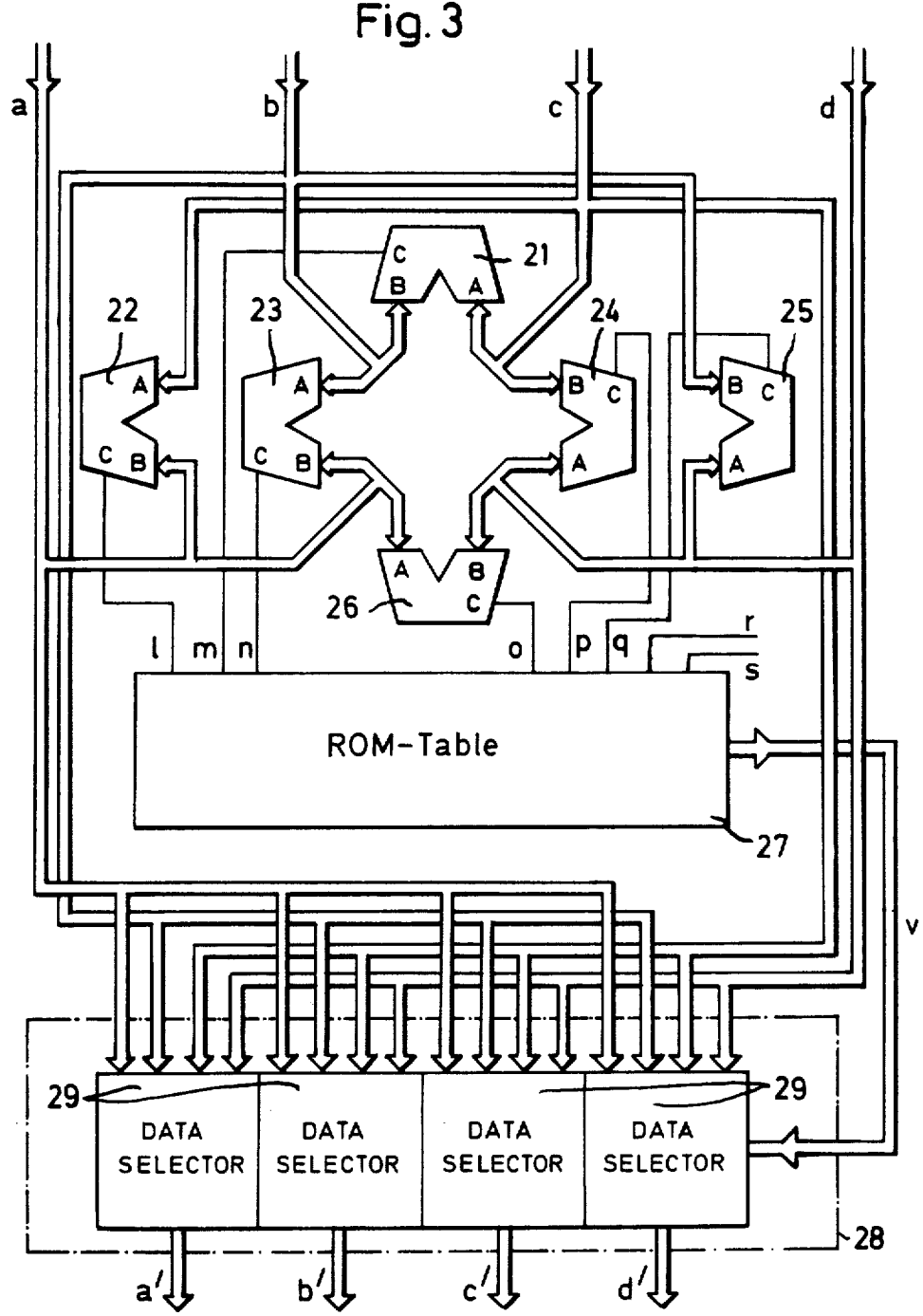
FIG. 3 is a circuit arrangement for sorting four input values according to rank, using ALU's, a ROM table as an evaluation circuit and a network of data selectors for transferring the input values in the established order of rank.

FIG. 3 shows an embodiment using four input channels a, b, c and d. Via inputs A and B of the six arithmetic logic units (ALU's) 21 to 26, the four input channels are interconnected with one another so that the values of all four input channels are compared with one another simultaneously. In the embodiment shown, the carry outputs of ALU's 21 to 26 are connected to the ROM table 27 via lines 1 to q. It is, of course, also possible to utilize the ALU sign outputs. In either case, the subtraction instructions are issued to all ALU's through lines not shown. The six signal lines 1 to q are used as addresses for the ROM table, that is, each possible combination of carry bits is allotted a memory location in the ROM table which holds the corresponding control information for the data selector network 28.

The data selector network 28 is made up of as many data selectors 29 as the circuit arrangement possesses input channels; controlled by the ROM table, each data selector 29 connects through a different input channel so that the input channels a to d will appear on the network output side resorted in the sequence a' to d' corresponding to their defined rank order. It is also possible to select two or three of the input channels, for example, the one with the lowest value and the one with the highest value. In this case, two data selectors 29 of FIG. 3 would be omitted.

It is a particular advantage to supply additional bit patterns of an instruction bus to the ROM table through one or several address lines r, s. For any possible combination of the values of input channels a to d, several items of control information may thereby be made available to the data selectors among which the selection may be performed via the instruction bus. In addition, the instruction buses for the ALU's may also be included in the process, as the case may be.

It is to be understood that the invention as illustrated in the embodiment of FIGS. 1 and 3 also applies to more than four input channels. In the embodiments described, three and four input channels were merely chosen for the sake of maximum clarity.

One field of application for the circuit arrangements described is the video-rapid image analysis. Further advantageous possibilities of application exist in all areas of digital signal processing using hardware circuits.

It is further understood that the foregoing description is that of the preferred embodiments of the invention and that various changes and modifications may be made thereto without departing from the spirit and scope of the invention as defined in the appended claims.

What is claimed is:

1. A circuit arrangement for performing rapid sortation or selection according to rank of at least three digital values present as a bit pattern on respective input channels, the circuit arrangement comprising:

a plurality of digital comparators connected to said input channels so that each value on each input channel is compared with each value on every other input channel simultaneously and for providing output quantities indicative of the comparison of said values; and, evaluation circuit means connected to said outputs of said digital comparators for processing the output quantities thereof to prepare appropriate control signals.

2. The circuit arrangement of claim 1, said evaluation circuit means being a gate-logic circuit.

3. The circuit arrangement of claim 2 comprising a further circuit portion; and, data selector means connected to said gate-logic circuit for coupling the input channel (a') determined by said gate-logic circuit to said further circuit portion.

4. A circuit arrangement for performing rapid sortation or selection according to rank of at least three digital values present as a bit pattern on respective input channels, the circuit arrangement comprising:

a plurality of arithmetic logic units connected to said input channels so that each value on each input channel is compared with each value on every other input channel simultaneously and for providing output quantities indicative of the comparison of said values; and, evaluation circuit means connected to said outputs of said units for processing the output quantities thereof to prepare appropriate control signals.

5. The circuit arrangement of claim 4, said outputs of said arithmetic logic units connected to said evaluation circuit means being carry outputs.

6. The circuit arrangement of claim 4, said outputs of said arithmetic logic units connected to said evaluation circuit means being sign outputs.

7. The circuit arrangement of claim 4, said evaluation circuit means being a gate-logic circuit.

8. The circuit arrangement of claim 4, said evaluation circuit means being configured to define a ROM table.

9. The circuit arrangement of claim 8 comprising a further circuit portion; and, data selector means connected to said evaluation circuit means for coupling the input channel (a') determined by said evaluation circuit means to said further circuit portion.

10. The circuit arrangement of claim 8 comprising a further circuit portion; and, data selector network means connected to said evaluation circuit means for coupling all input channels (a to d) in order of rank (a' to d') determined by said evaluation circuit means to said further circuit portion.

11. The circuit arrangement of claim 8 comprising a further circuit portion; and, a plurality data selectors connected to said evaluation circuit means for coupling several selected input channel to said further circuit portion.

12. The circuit arrangement of claim 8 wherein the circuit arrangement is associated with an instruction bus for providing a bit pattern, and wherein said arrangement comprises a plurality of data selectors connected to said evaluation circuit means, said evaluation circuit means including a plurality of address inputs, a portion of said address inputs being allocated for receiving the bit pattern of the instruction bus whereby said evaluation circuit means is switchable for providing various items of control information for said plurality of data selectors.

* * * * *